United States Patent

[11] 3,612,463

| [72] | Inventor | Andrew Grant<br>81 Drakefield Road, Markha, Ontario, Canada |
|------|----------|----|
| [21] | Appl. No. | 854,450 |
| [22] | Filed | Sept. 2, 1969 |
| [45] | Patented | Oct. 12, 1971 |
| [32] | Priority | Feb. 6, 1969 |
| [33] | | Canada |
| [31] | | O 42,123 |

[54] WEDGING DEVICE FOR PALLET LOADS
6 Claims, 6 Drawing Figs.

[52] U.S. Cl. .................................................. 248/354 P, 248/57, 254/113
[51] Int. Cl. ...................................................... F16f 15/04
[50] Field of Search .......................................... 254/1, 57, 62, 63, 113, 115, 116, 119; 248/351, 354 R, 354 P, 57, 72

[56] References Cited
UNITED STATES PATENTS
1,793,035  2/1931  Whitney ......................  248/354 P X
FOREIGN PATENTS
719,699  12/1954  Great Britain ................  248/354 P
731,410  9/1932  France .........................  248/354 P

*Primary Examiner*—Robert C. Riordon
*Assistant Examiner*—David R. Melton
*Attorney*—Fetherstonhaugh and Co.

ABSTRACT: A device for wedging pallet loads comprising a two-part extensible brace, a first part of the device consisting of a pair of side-by-side parallel plates fixed together along their bottom edges and having an end plate carrying means for securing the first part to the pallet, the second part of said device being a single plate member fitted between the two side plates of the first part. The first and second parts are adapted to cooperate with one another by means of a releasable pin and complementary coupling to secure adjacent portions of a pallet load.

INVENTOR.
ANDREW GRANT.

BY *Fetherstonhaugh & Co.*

ATTORNEYS

INVENTOR
ANDREW GRANT
BY Featherstonhaugh & Co.
ATTORNEYS

WEDGING DEVICE FOR PALLET LOADS

FIELD OF INVENTION

This invention relates to the shipment of goods on pallets and is particularly concerned with a device for wedging pallet loads to prevent them from shifting during shipment.

PRIOR ART

In the mass shipment of packaged goods, various methods are employed to accomplish the loading and unloading procedures. The most basic is hand loading and unloading of the individual containers or cases but which, while offering certain advantages such as the ability to tightly build up the load and thus minimize the opportunity for damage while in transit, is nonetheless and by far the most costly in terms of man hours.

Of the alternatives available, one of the most widely employed involves the use of pallets which permit a more rapid moving, stacking and storage of a multiple of containers or cases. In this method, however, and while man hours involved can be substantially reduced, certain factors of disadvantage are inherent such as the need to employ cumbersome and invariably expensive dunnage of various types to fill in the load cavity areas and adequately secure the load. This is due to the fact that of the many pallet sizes employed throughout industry, few are of such dimensions as to permit snug fitting of the load in many of the carrying vehicles. Dunnage is, therefore, employed and viewed as a necessary inconvenience and expense which must be tolerated in view of the overall savings offered by palletized shipping.

Attempts have been made to overcome the problem however, by the development and testing of various loading patterns designed to minimize in transit damage while employing as little dunnage as possible. One pattern involves the practice of setting the loads away from the side walls so as to reduce the width of the center aisle in the hope that the width of the aisle will be reduced to such an extent as to substantially minimize the possibility of individual containers or cases falling or tumbling into same. This pattern also suggests that under normal in transit handling, the load should be sufficiently stable by virtue of mass and weight as to preclude the chance of significant partial or total load shift. Experience has shown however, that while this pattern has met with some success, displacement or tumbling of the higher placed portions of the load into the center cavity and also shift of the load in total and invariably towards the center does occur with resulting damage. Further, experience also now indicates that by placing the load in the manner described and which permits side to side rocking, undesirable pressure points are created. This pressure effect it would appear, while not necessarily localized, is no doubt more pronounced along the side contact areas at the point where the second or higher pallet contacts and rests on the top cases of the bottom load portion. The result is such as to create a crushing effect upon and along the outside edges of the cases supporting the rocking pallets and of sufficient intensity as to cause both case and inner container collapse. This pattern, then, appears to be damage prone due to lack of lateral stability.

A second loading pattern that is now in use involves leaving a space between two side-by-side pallets and one side wall of the vehicle. The aisle that is formed along the side of the vehicle is then hand loaded by dunnage but this is both a difficult and time-consuming operation. This is due to the fact that regardless of which portion may be loaded first, hand or palletized, the remaining portion is difficult to place in position by virtue of restricted access and which by necessity must be so if the load is to ride securely. The benefits to be derived from this arrangement are, therefore, substantially offset by the man hours consumed in the hand loading process.

SUMMARY

In utilizing the wedging device of the present invention, it is proposed to use a loading pattern similar to the first example described above except that no attempt is made to set the loads away from the side walls of the vehicle in an effort to reduce the width of the center aisle. Rather, the loads are set tight against the side walls of the vehicle and the wedging devices of the present invention are inserted in the aisle as to brace the load as a whole. This particular loading pattern, i.e. leaving a wide aisle in the center of the vehicle, is used at present but only by utilizing considerable quantities of various dunnage types designed to fill the aisle. These dunnage types run the range from metal, wood or composite board sheets of varying size such as 4 inches ×8 inches placed in upright position along both sides of the aisle and cross joined, to inflatable, disposable bags which are also positioned within and along the center aisle. While reducing damage to a minimum, and also permitting palletized loading process to be used to full advantage, dunnage costs are high and the handling inconvenient. These factors, therefore, tend to discourage wide acceptance.

As will be appreciated from the above, therefore, it is the prime object of the present invention to provide a wedging device for locking pallet loads wherein the pallets are dimensioned relative to the size of the carrying vehicle to leave a fairly wide center aisle.

It is a more specific object of the invention to provide a wedging device of the above type which can be made at low cost, is easy to use and rugged.

The invention will be more thoroughly understood from the following description of the preferred embodiment thereof as read in conjunction with the accompanying drawings.

In the drawings which illustrate this preferred embodiment,

Figure 1:
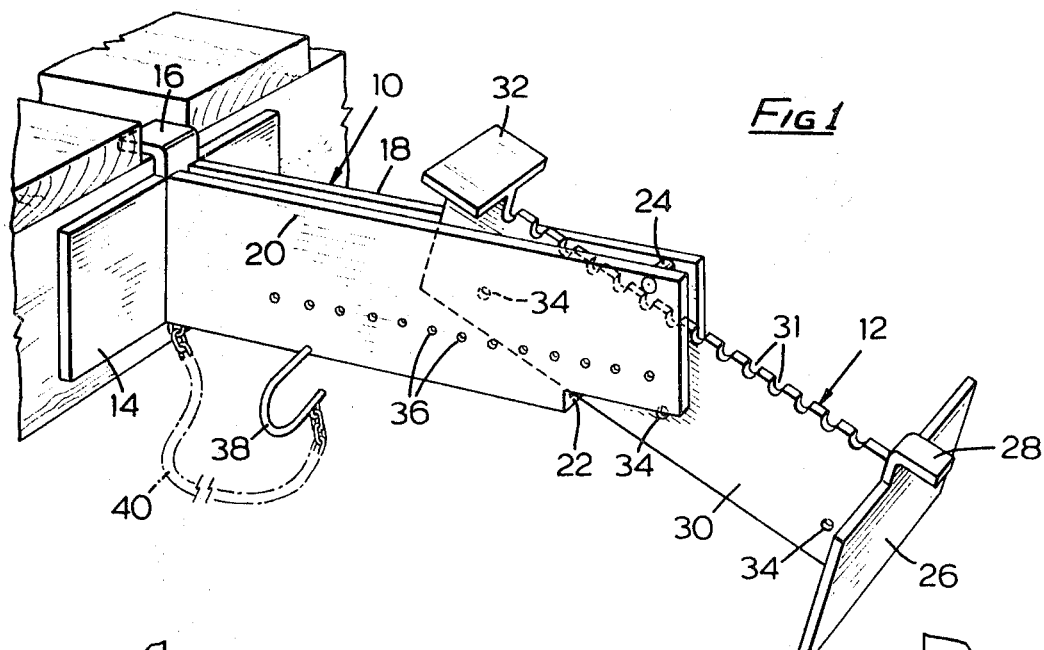
FIG. 1 is a perspective view of a wedging device in accordance with this preferred embodiment of the invention and showing the device in the form it would take as it is being installed in a pallet load.

Referring to FIG. 1, the wedging device of the invention essentially consists of two parts 10 and 12 which are preferably formed of iron or steel. Either or both parts may be built up from plate material as by stamping, forging and welding or one or the other or both of the parts might be cast.

As can be seen in FIG. 1, part 10 consists of an end plate 14 having a lip member 16 which acts as a pallet engaging means and a pair of longitudinal plates 18 and 20 connected together along their lower edges by bottom wall 22 and by a transverse pin 24 at their outer ends. Part 12 consists of an end plate 26 having a lip 28 which acts as a second pallet engaging means and a single longitudinal plate 30 carrying at its other end a handle 32. The top edge of plate 30 is provided with a plurality of notches 31 dimensioned to receive pin 24.

To provide the device with means for locking it, plate 30 is provided with three spaced holes 34 while plates 18 and 20 of part 10 are provided with holes 36 whereby a U-bolt 38 can be slipped into these holes. As a matter of convenience, the latter is carried on a chain 40 which is fixed at its other end to part 10.

It will be appreciated from the above that the wedging device of the invention essentially consists of an extensible brace having means for locking it in any desired extended position. In using the device, it is placed between the opposed pallets in the manner shown in FIG. 2 with the two parts being arranged at an angle to one another so that an outward axially directed force against the two pallets can be effected by pushing down on handle 32 to work the device into the position shown in FIG. 3 at which point one of the holes 34 will be aligned with one of the holes 36 whereupon the U-bolt 38 can be passed through the holes as to lock the device. Alignment of the holes 34 and 36 is ensured by their proper placement during manufacture relative to the notches 31.

Figure 2:
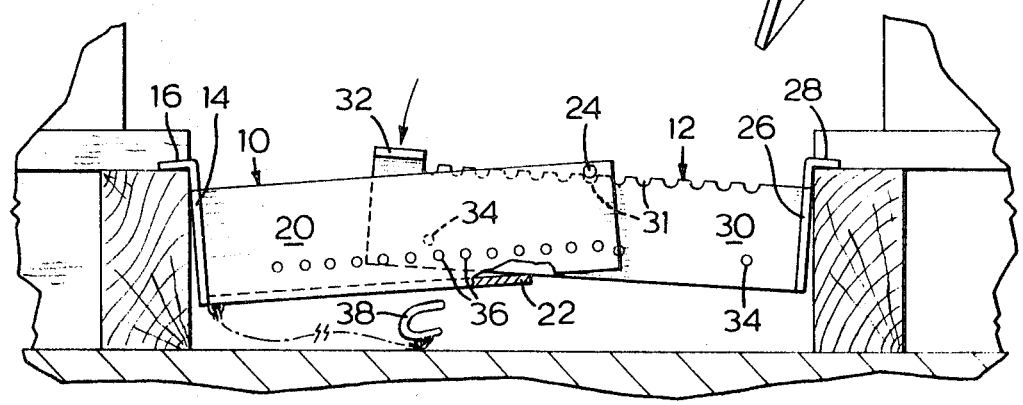
FIG. 2 is an elevation view of a portion of the pallet load particularly showing a center aisle between two pallets and illustrating the manner in which the wedging device of this embodiment of the invention is installed between the pallets.

It will be appreciated that outwardly directed forces of varying degree can be effected by the wedge of the invention by selecting one or other of notches 31 for receiving pin 24. If it is desired to push out against the opposed pallets with considerable force, the two parts will be arranged so that they form a sharper angle relative to one another than is shown in FIG. 2, i.e. pin 24 will be dropped into one of the notches which lies closer to handle 32. Of course, the greater the angle selected, the more manual exertion will be required in order to move the two parts into the position shown in FIG. 3.

Figure 3:
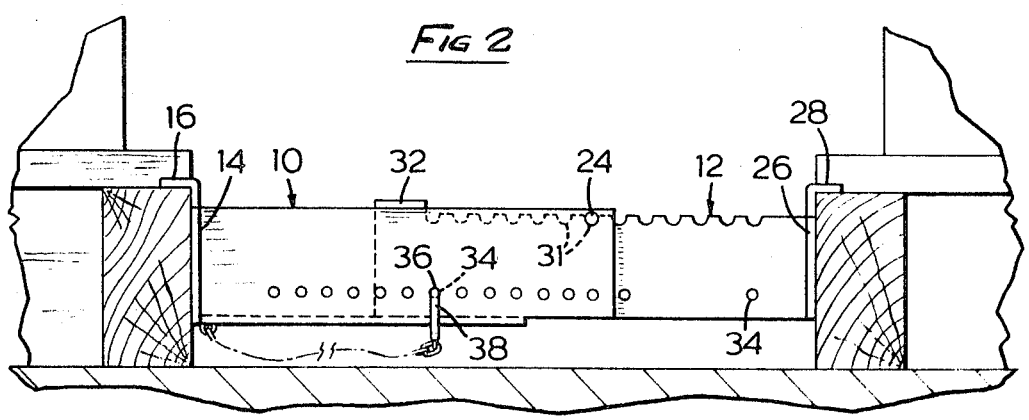
FIG. 3 is a view similar to FIG. 2 but showing the wedging device in the form it takes when it has been installed between two pallets.

As a preferred expedient, notches 31 are provided with a depth which guarantees the two parts will be axially aligned although the notches could be made a little deeper than is shown in FIG. 3 so that there is a toggle effect when the two parts are brought together. The straight alignment is the preferred arrangement, however, as it eliminates any problem in aligning one or other of the holes 34 with holes 36.

To release the device from the position shown in FIG. 3, it is only required to remove U-bolt 38 and to tap upwardly against the underside of handle 32 as to release the wedges from their axial alignment. As a preferred expedient, the holes 34 and 36 are made slightly larger than the diameter of U-bolt 38 so that the U-bolt is now jammed by the two parts of the device. In this regard, it will be appreciated that U-bolt 38 does not bear any of the load imposed upon the device by the weight of the pallets. This load is borne by the pin 24.

In using the wedging device of the invention, it is a relatively simple matter for a workman to reach into the middle area of the opposed pallets and to drop the lips 16 and 28 onto the top surfaces of the pallets as shown in FIG. 2 and to then pull or push downwardly upon handle 32 to align the two parts as shown in FIG. 3 after which bolt 38 is placed in the particular pair of holes 34 and 36 which happen to be aligned. In the normal course, the workman involved will be a forklift truck operator. Thus, a preferred routine of loading a railway freight car, for example, is for the operator to place two opposed pallet loads at the end of the car and then to insert one of the wedging devices between those two pallets before moving the next two pallets into position.

Figure 4:
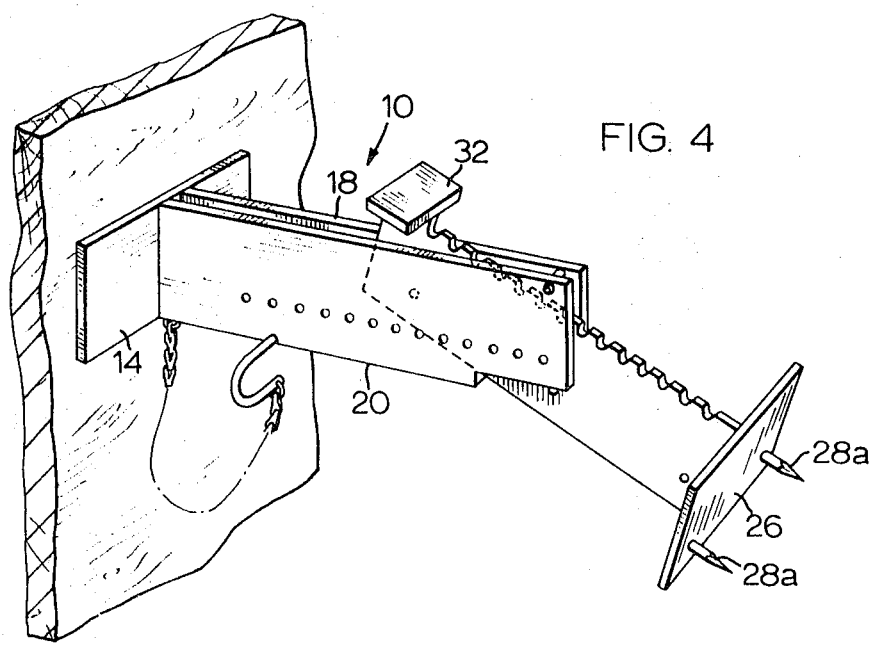
FIG. 4 is a view similar to FIG. 1 showing an alternative form of pallet engaging means.
Figure 5:
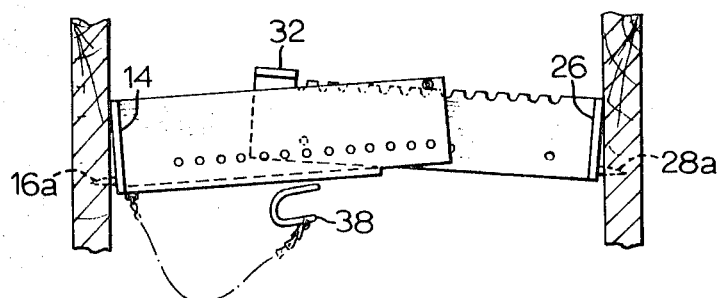
FIG. 5 is a view similar to FIG. 2 showing a first step in the use of the device of FIG. 4.
Figure 6:
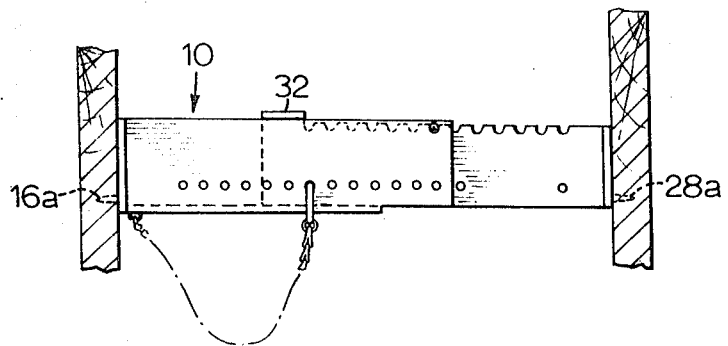
FIG. 6 is a view similar to FIG. 3 showing a further step in the use of the device of FIG. 4.

An alternative type of pallet engaging means is shown in FIG. 4 where spikes 16a and 28a are formed on the outer surface of the end plates 14 and 26 respectively. It will be apparent that in use the spikes are forced into the opposed wooden pallets and serve to securely anchor the pallets relative to one another. These and other modifications will be apparent to those skilled in the art without departing from the spirit of the invention.

What I claim is:

1. A wedging device for pallet loads comprising a two-part extensible brace, one part consisting of a pair of side-by-side parallel plates having an inner end and an outer end, said plates being fixed together along their bottom edges by bottom forming means having an inner end spaced a substantial distance from the inner end of said parallel plates, said first part having an end plate carrying a pallet engaging means, the other part being a single plate member fitted between the two side-by-side plates of the other part and carrying handle means extending upwardly from one end and adapted to rest on the top edges of said side-by-side plates of the other part, the upper edge of said second part being notched, said first part including a pin extending between said two plate members at the outer end thereof adjacent the upper edge of said first part, said pin being adapted to fit within any one of said notches of said second part to lock said parts together when said first and second parts are axially aligned, said pin means being spaced from the inner end of said bottom forming means a distance greater than the height of said second part whereby said second part may be moved relative to said first part when obliquely inclined relative to said second part by sliding said second part to and fro through the gap formed between said pin and said inner end of said bottom forming means, said pin means cooperating with said carrying handle means to prevent said parts from becoming separated when said pin means and said notches are disengaged, said second part also having an end plate and pallet engaging means.

2. A wedging device as claimed in claim 1 including locking means for preventing relative pivotal movement between said parts when said device has been wedged between a pair of pallets.

3. A wedging device as claimed in claim 2 in which said locking means comprises a plurality of alignable holes in each of said parts and bolt means adapted to be passed through the aligned holes.

4. A wedging device as claimed in claim 3 wherein said bolt means comprises a U-bolt being carried at the free end of a chain with the other end of the latter being fixed to one of said parts.

5. A wedging device as claimed in claim 4 wherein said pallet engaging means is in the form of a lip protruding from the upper edge of said end plates to overlie an edge portion of the adjacent pallets.

6. A wedging device as claimed in claim 4 wherein said pallet engaging means is in the form of spike means protruding from said end plates and adapted to be inserted into oppositely disposed pallets to engage said pallets in use.

UNITED STATES PATENT OFFICE
CERTIFICATE OF CORRECTION

Patent No. 3,612,463          Dated October 12, 1971

Inventor(s) Andrew Grant

It is certified that error appears in the above-identified patent and that said Letters Patent are hereby corrected as shown below:

On the cover sheet [72], "Markha, Ontario" should read -- Markham, Ontario --.

Signed and sealed this 12th day of September 1972.

(SEAL)
Attest:

EDWARD M. FLETCHER, JR.              ROBERT GOTTSCHALK
Attesting Officer                    Commissioner of Patents